United States Patent [19]

Frommelt et al.

[11] Patent Number: 4,825,607
[45] Date of Patent: May 2, 1989

[54] MOLDED MODULAR DOCK SHELTER

[75] Inventors: John A. Frommelt, Dubuque; Robert J. Frommelt, Peosta, both of Iowa

[73] Assignee: Frommelt Industries, Inc., Dubuque, Iowa

[21] Appl. No.: 75,807

[22] Filed: Jul. 20, 1987

[51] Int. Cl.[4] .............................................. E04H 14/00
[52] U.S. Cl. ................................. 52/173 DS; 49/505; 49/482
[58] Field of Search .............. 52/173 DS; 49/505, 482

[56] References Cited

U.S. PATENT DOCUMENTS

| | | | |
|---|---|---|---|
| 2,727,596 | 12/1955 | Smith | 49/505 |
| 3,375,625 | 4/1968 | Edkins | 52/173 DS |
| 3,403,489 | 10/1968 | Frommelt et al. | |
| 3,699,733 | 10/1972 | Frommelt et al. | |
| 4,223,487 | 9/1980 | St. Clair | 52/90 |
| 4,293,135 | 10/1981 | Wallace | 49/482 |
| 4,381,631 | 5/1983 | Frommelt | |
| 4,731,952 | 3/1988 | Mascotte | 49/505 |

FOREIGN PATENT DOCUMENTS 2927233 1/1981 Fed. Rep. of Germany ... 52/173 DS

Primary Examiner—Henry E. Raduazo
Attorney, Agent, or Firm—Emrich & Dithmar

[57] ABSTRACT

A dock shelter adapted for mounting to a wall about an opening in the wall includes a plurality of coupled outer panels comprised of molded plastic. The plastic outer panels include a pair of roof sections as well as left and right lateral sections each coupled to a respective distal end of a roof section. Each lateral section includes respective pairs of upper and lower side panels coupled together in a telescoping manner to allow the height of the dock shelter to be fixed as desired over a range of values. Similarly, the roof sections are coupled together by means of a center roof connector cap in a telescoping manner to allow for adjustment of the width of the dock shelter. The telescoping coupling arrangement between the various dock shelter structural members allows the dock shelter to be used with a wide range of wall opening sizes. The plastic outer panels are sturdy and weather-resistant and each includes an outer angle portion to which either a head curtain or a side curtain may be attached so as to form a weather resistant, leak proof, outer structure for the inner dock shelter components which include a metal support/reinforcing structure and a pair of bottom pad seals. The plastic outer panels, formed by rotational molding in a preferred embodiment, are inexpensively fabricated, lightweight yet strong, and easily assembled and installed.

16 Claims, 3 Drawing Sheets

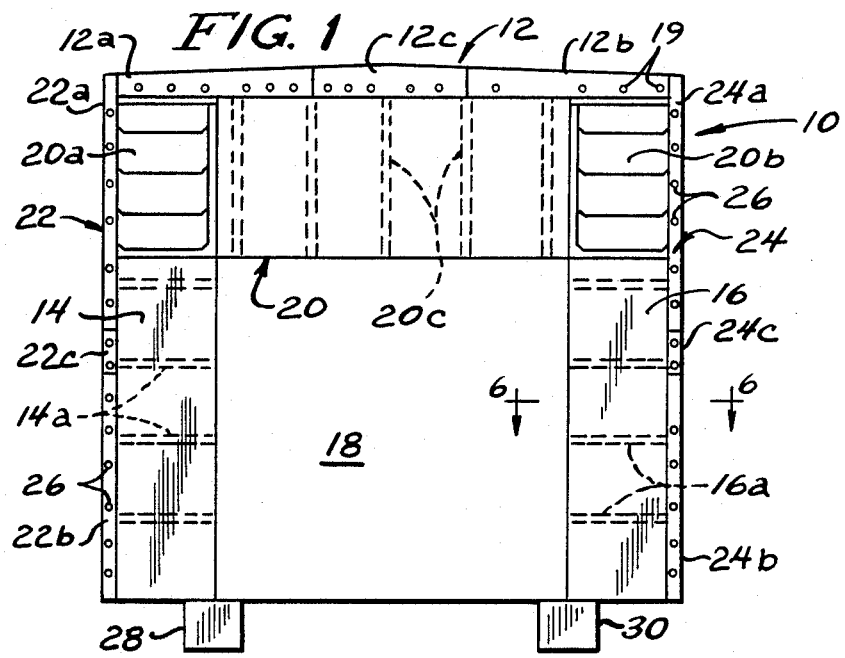
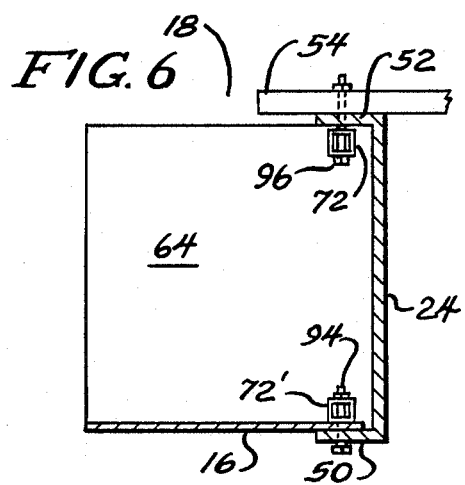
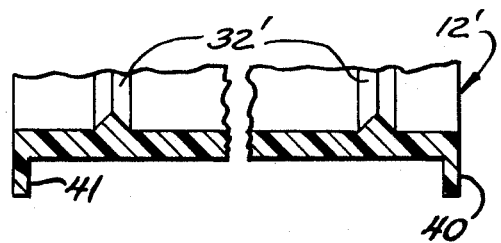
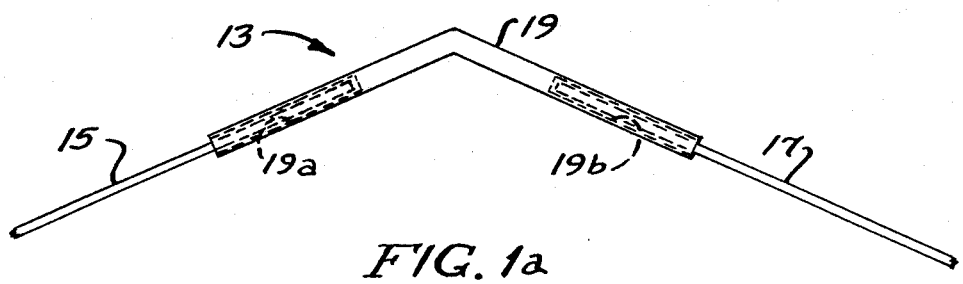

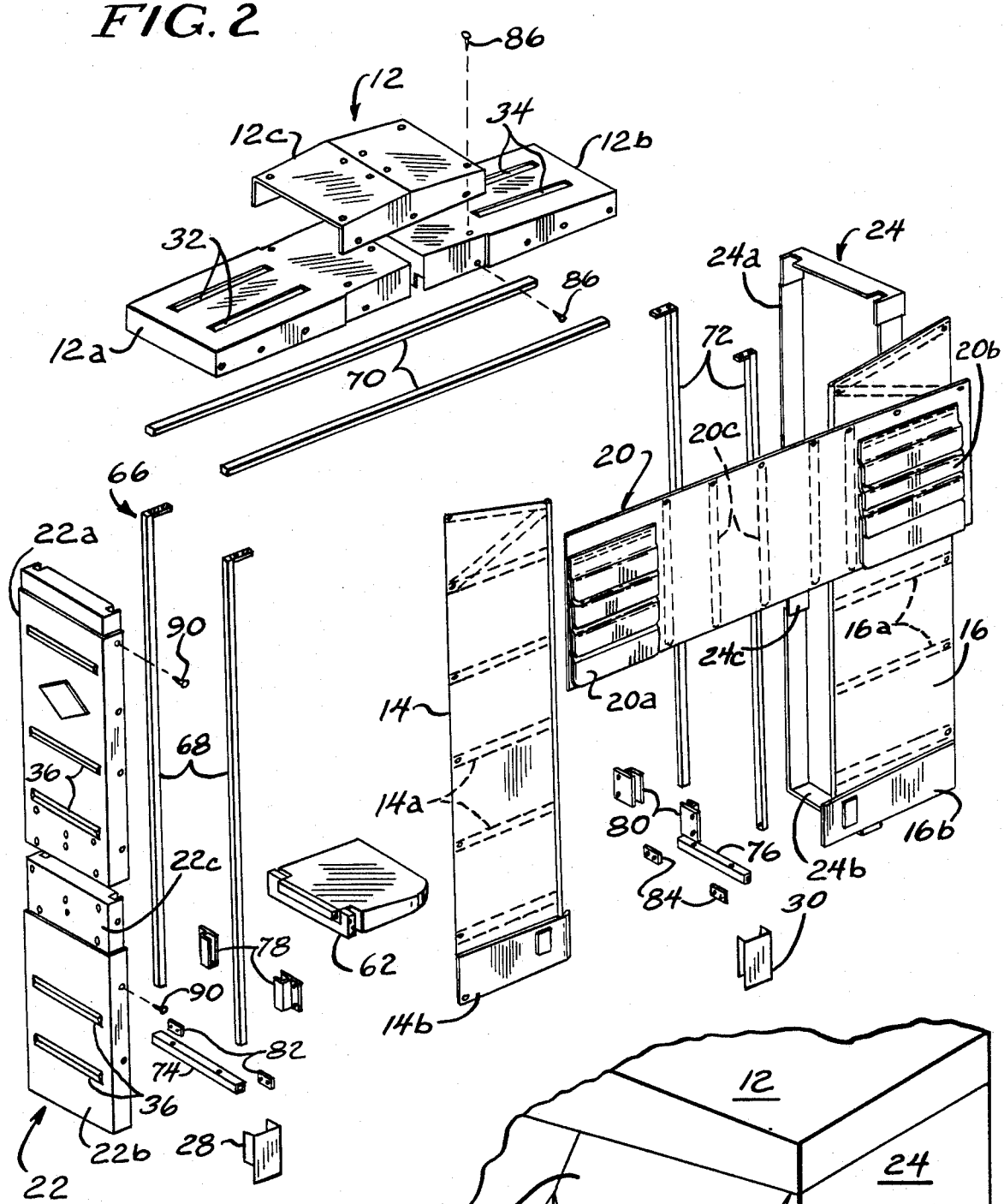
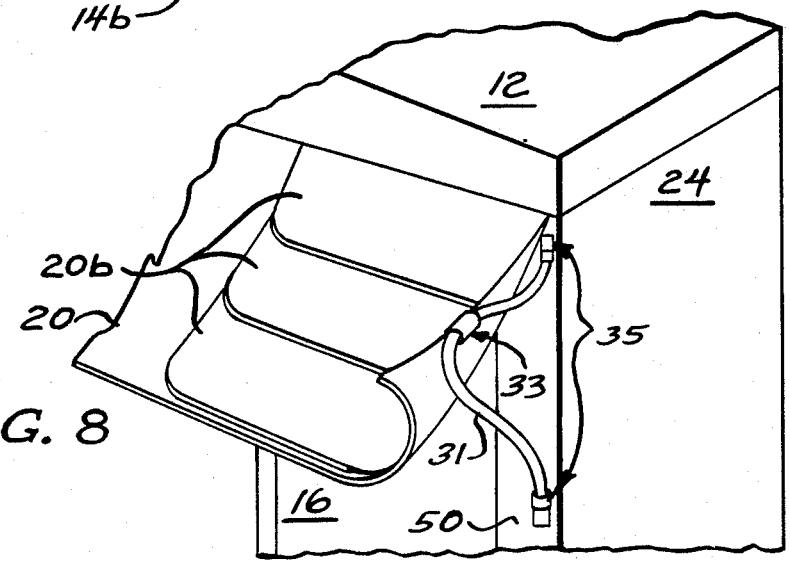

MOLDED MODULAR DOCK SHELTER

BACKGROUND OF THE INVENTION

This invention relates generally to loading dock shelters and is more particularly directed to a modular dock shelter with outer panels of molded plastic.

A loading dock shelter is positioned on the outer surface of a building wall and is disposed about an aperture, or doorway, within the wall for isolating the inside of the building from the outside environment and for sheltering men and materials during the loading and unloading of a truck, or the like, through the doorway. Loading dock shelters are generally classified into two different types: (1) those embodying resilient pad members, and (2) those making use of fabric or sheet material so as to form walls or curtains. In the former type of dock shelter employing resilient pads, a truck to be loaded or unloaded is backed into abutting contact with a wall mounted arrangement of resilient pad members which provide a tight seal around the aft peripheral edges of the truck. In the latter type of shelter, which is typically referred to as a "drape type" loading dock shelter, walls or curtains, which consist of fabric or sheet material supported in more or less a tentlike manner, are draped around a truck in sealing engagement therewith. The present invention is directed to the latter, or "drape", type of loading dock shelter.

The drape type loading dock shelter is securely mounted to an outer surface of the wall as a permanent fixture and is generally disposed about the upper and facing lateral edges defining the doorway within the wall. As such, the dock shelter is continuously exposed to the elements and should therefore be highly weather resistant. Some dock shelters include a rigid support structure which is typically bolted to the outer surface of the wall and provides support for the flexible and resilient walls or curtains which engage the sides of the truck in a sealed manner. The dock shelter, and particularly its rigid support structure, is subject to impact by a truck or other vehicle as it is positioned either prior to or after the loading or unloading process. Impact damage to the loading dock shelter generally reduces the extent of sealing engagement between the truck and the dock shelter and frequently results in exposure of internal dock shelter components to the outside environment causing premature and rapid deterioration of the dock shelter structure. Thus, while a dock shelter structure must be durable enough to withstand the outside elements, it must also be strong enough to withstand large impact forces while maintaining the dock shelter curtains in sealed engagement about the periphery of the truck.

The present invention affords the aforementioned advantages and thus represents an improvement over the prior art by providing a modular loading dock shelter which includes an outer frame preferably comprised of three coupled sections, with each section preferably formed of a high strength molded plastic. With each section comprised of a plurality of coupled telescoping panels, the dock shelter can be varied in height and width so as to accommodate a wide range of doorway sizes. The dock shelter is sturdy yet resilient and highly weather resistant, and is inexpensively fabricated and easily assembled and installed.

OBJECTS OF THE INVENTION

Accordingly, it is an object of the present invention to provide a weather resistant, structurally strong, lightweight and inexpensive loading dock shelter.

Another object of the present invention is to provide a loading dock shelter for an opening in a wall which is adapted for positioning about various openings having a wide range of sizes.

A further object of the present invention is to provide a loading dock shelter of modular construction which is easily fabricated and assembled and is comprised of a small number of components.

A still further object of the present invention is to provide a loading dock shelter which is structurally strong and also resilient and is thus capable of withstanding vehicular impact.

Yet another object of the present invention is to provide a lightweight loading dock shelter which is of simple construction and is easily attached to or removed from a wall about a doorway therein.

Still another object of the present invention is to provide an improved loading dock shelter embodying a novel outer panel construction for effecting sealed engagement with a truck or like vehicle.

The present invention contemplates a loading dock shelter which includes an outer structure comprised of a roof section and a pair of side sections coupled to and extending downward from respective ends of the roof section. In a preferred embodiment, each of the roof and side sections is preferably comprised of a high strength plastic and is formed by a rotational molding process. In addition, each of the roof and side sections includes an outer angle to which a head curtain and respective side curtains are attached in a sealed manner. In one embodiment, the roof panel is in the form of a raked header and includes first and second end panels and an intermediate roof cap which is coupled to each of the end panels in a telescoping manner. Similarly, each of the side sections is comprised of an upper and a lower panel also coupled together in a telescoping manner. The height and width of the dock shelter may thus be varied as desired to accommodate a wide range of wall aperture dimensions. An inner reinforcing structure comprised of coupled metal bars or rods is disposed within the three sections of the dock shelter and provides high strength while being isolated from the outside environment by the aforementioned roof and side panels as well as the head and side curtains respectively extending therefrom.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a front plan view shown partially in phantom of a molded, modular loading dock shelter in accordance with the present invention;

FIG. 1a is a front plan view shown partially in phantom of another embodiment of a roof for use in the dock shelter of the present invention;

FIG. 2 is an exploded perspective view shown partially in phantom of the loading dock shelter of FIG. 1;

FIG. 6 is a sectional view of a portion of the loading dock shelter illustrated in FIG. 1 taken along sight line 6—6;

FIG. 7 is a sectional view of a portion of the loading dock shelter illustrated in FIG. 3 taken along sight line 7—7 therein; and FIG. 8 is a respective view of an upper, outer, lateral portion of the molded, modular dock shelter illustrating the mounting of a wind strap to the dock shelter's head curtain.

DETAILED DESCRIPTION OF THE PREFERRED EMBODIMENTS

Figure 3:
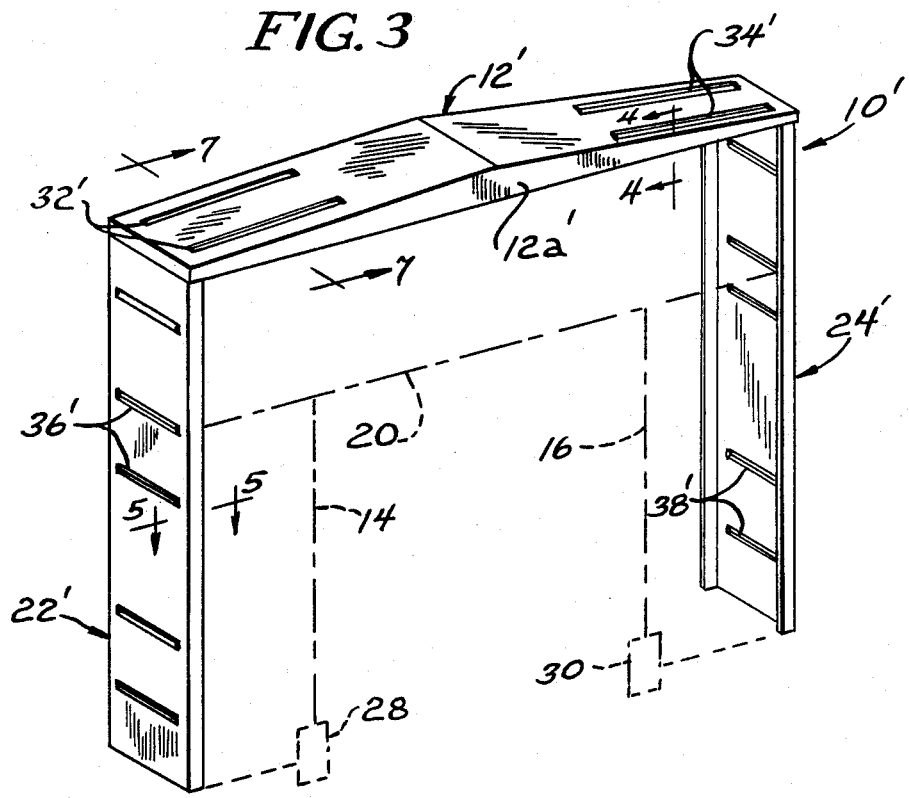
FIG. 3 is an upper perspective view shown partially in phantom of another embodiment of a molded, modular loading dock shelter in accordance with the present invention.

Referring to FIGS. 1 and 2, there are respectively shown front planar and exploded perspective views of one embodiment of a loading dock shelter 10 in accordance with the present invention.

The loading dock shelter 10 includes a roof 12 and left and right side sections 22 and 24. Left and right are used herein with the dock shelter viewed from the front. The roof 12 includes left and right roof panels 12a and 12b as well as a center roof cap 12c. The center roof cap 12c has a "peaked" center portion while the left and right roof panels 12a, 12b are tapered. The tapered left and right roof panels 12a and 12b provide the roof 12 with a raked configuration and are each provided with a respective pair of spaced, elongated reinforcing ribs 32 and 34 for increased roof panel strength. The center roof cap 12c is adapted for tight fitting positioning upon and coupling to the inner end portions of the left and right roof panels 12a, 12b. The upper portions as well as the front and aft angle portions of each of the left and right roof panels 12a, 12b and the center roof cap 12c are provided with a plurality of aligned apertures which are adapted for receiving connecting pins 19 such as screws or bolts, by means of which the several roof panels may be securely coupled together to form a rigid, sealed structure. By incorporating a plurality of spaced, aligned apertures in the center roof cap 12c as well as in the left and right roof panels 12a and 12b, the extent of overlap of the coupled roof panels may be varied depending upon the width of the doorway with which the dock shelter 10 is used. In this manner, the various connected roof panels provide a telescoping capability for the roof 12 and allow its longitudinal dimension to be varied over a range of lengths.

Referring to FIG. 1a, there is shown another roof construction contemplated for use in the present invention. In this arrangement, the roof 13 includes left and right side sections 15 and 17 which are adapted for insertion within respective slots 19a and 19b of an inverted, generally V-shaped center section 19. By inserting each of the side sections 15, 17 a given distance within the center section 19 and fixedly attaching these roof members, the length of the roof 13 may be adjusted as desired to match the width of the wall opening with which it is to be used.

In the embodiment shown in FIGS. 1 and 2, the left side section 22 is comprised of upper and lower panels 22a and 22b. The lower panel 22b is provided with a slightly recessed extension 22c which is adapted for overlapping engagement with the upper panel 22a. A plurality of spaced, aligned apertures in the upper panel 22a as well as is in the proximal end of the lower panel extension 22c permit the two panels to be securely coupled together by means of a plurality of connecting pins 26 such as screws or bolts inserted through these apertures. The upper and lower panels 22a, 22b may be securely coupled virtually anywhere along the length of the lower panel extension 22c to allow the length of the left side section 22 to be adjusted depending upon the height, or vertical dimension, of the doorway with which the dock shelter 10 is used. The right side section 24 similarly is comprised of upper and lower panels 24a, 24b with the lower panel having an extension 24c adapted for overlapping engagement with the upper panel. The lower panel extension 24c coupled to the upper panel 24a provides the right side section 24 with a telescoping capability as in the case of the left side section 22 to allow the dock shelter 10 to be used with a wide range of wall aperture dimensions. The upper and lower panels 22a, 22b of the left side section 22 are provided with a plurality of spaced, elongated reinforcing ribs 36 for added strength. Similar reinforcing ribs are provided for in the upper and lower panels 24a, 24b of the right side section 24, although these are not shown in the figures for simplicity. Finally, although the extension portion for coupling the upper and lower panels of each side section is shown as extending from the lower panel, it could in another embodiment extend downward from the upper panel. In yet another embodiment, each side section may consist of upper, lower and intermediate panels, with the intermediate panel coupled to each of the upper and lower panels in a telescoping manner.

The upper edge portions of each of the left and right side sections 22, 24 are adapted for positioning within and coupling to respective outer end portions of the left and right roof panels 12a, 12b. Coupling between the side sections 22, 24 and respective ends of the roof 12 may be accomplished by means of suitable connecting pins such as screws or bolts inserted through aligned apertures in the roof and each side section. With the center roof cap 12c positioned in tight fitting relation over the inner end portions of the left and right roof panels 12a, 12b and with the left and right side sections 22, 24 positioned within the angled end portions of the left and right roof panels, the upper portion of the dock shelter forms a sealed structure which prevents water from entering into the dock shelter.

The dock shelter 10 further includes an inner metal support frame 66 which increases the strength of the dock shelter and facilitates coupling between the various dock shelter members. The inner support frame 66 includes a plurality of high strength reinforcing bars which are preferably tubular and comprised of metal such as steel or aluminum. The inner support frame is comprised of a pair of left side reinforcing bars 68 coupled together at respective lower ends thereof by means of the combination of a left lower reinforcing bar 74 and a pair of tie plates 82. The internal support frame 66 further includes a pair of right side reinforcing bars 72 coupled together at respective lower ends thereof by means of the combination of a right lower reinforcing bar 76 and pair of tie plates 84. The tie plates and reinforcing bars are coupled together by suitable connecting pins such as screws or bolts. Upper end portions of each of the left side reinforcing bars 68 are adapted for engaging and coupling to respective first ends of a pair of roof reinforcing bars 70. The roof reinforcing bars 70 are positioned within the roof 12, extend the length thereof, and are coupled to the roof in a manner described below. The second ends of each of the roof reinforcing bars 70 are each adapted for engaging and coupling to respective upper end portions of the right side reinforcing bars 72 by coupling pins. With the left and right side reinforcing bars 68, 72 thus connected to respective ends of the roof reinforcing bars 70 by suitable coupling pins, the internal support frame of the dock shelter 10 forms a generally rectangular structure open at the bottom and positioned within the assembled roof section 12 and left and right side sections 22, 24. In one embodiment, all of the aforementioned reinforcing bars have a square cross section 1¼ inch on each side.

Figure 4:
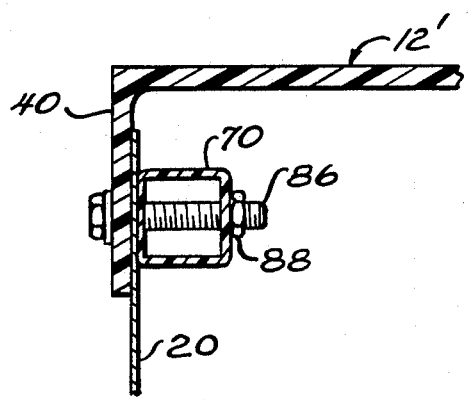
FIG. 4 is a sectional view of a portion of the loading dock shelter illustrated in FIG. 3 taken along sight line 4—4 therein.
Figure 5:
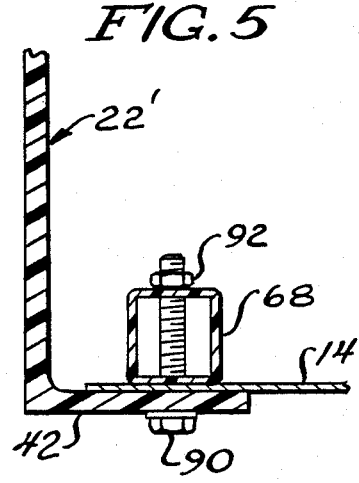
FIG. 5 is a partial sectional view of the loading dock shelter illustrated in FIG. 3 taken along sight line 5—5 therein.

Referring to FIGS. 4 and 5 which are sectional views of portions of the present invention as illustrated in FIG. 3 respectively taken along site lines 4—4 and 5—5 therein, the manner in which the various reinforcing bars of the dock shelter's internal support structure 66 are securely coupled to the roof 12' and left and right side sections 22', 24' will now be described. Each of the roof reinforcing bars 70 is provided with a plurality of spaced apertures along the length thereof and is positioned immediately adjacent to an inner surface of the forward and aft angle portions of the roof. This is shown in detail in FIG. 4 where the tubular roof reinforcing bar 70 is positioned immediately adjacent to the inner surface of the front angle 40 of the roof 12'. The upper edge of the head curtain 20 is positioned between the roof angle 40 and the reinforcing bar 70 and is thus disposed within the roof structure. The head curtain 20 is also provided with a plurality of spaced apertures along the length thereof adjacent to its upper edge, which apertures are positioned in alignment with apertures in the front angle 40 of the roof and apertures in the roof reinforcing bar 70. A threaded member such as a bolt 86 is then inserted through the aligned apertures of the roof angle 40, the head curtain 20, and the roof reinforcing bar 70 and is maintained in position therein by means of a nut 88. It is in this manner that the head curtain 20 as well as both roof reinforcing bars 70 of the internal support structure 66 are securely coupled to the roof 12'. The head curtain 20 is thus maintained in sealed engagement with the roof angle 40 along the length thereof and the reinforcing bars 70 increase the strength of the upper portion of the dock shelter 10'. A similar coupling arrangement is provided for the aft roof reinforcing bar and the aft angle of the roof, although this is not shown in the figures for simplicity.

The inner surface of the head curtain 20 is provided along the length thereof with a plurality of spaced, elongated stays 20c which provide the head curtain with a certain degree of rigidity while still remaining flexible as shown in FIGS. 1 and 2. The head curtain stays 20c are preferably comprised of a high strength, flexible material such as polyethylene, fiber glass or spring steel. This rigidity allows the head curtain 20 to remain in position about a truck positioned within the dock shelter 10 when subjected to an environmental effect such as wind, while its flexibility allows it to closely conform to the outer periphery of the truck without breaking or becoming permanently distorted. Respective ends of the head curtain 20 are provided with a plurality of outer left and right protective pleats 20a, 20b. Each of the pleats 20a, 20b, as well as the head curtain 20, may be made of any suitable material which is water repellant and wear resistant, such as, for example, canvas duck, rubber-impregnated nylon fabric, or hypalon. By attaching the upper edge portion of the head curtain 20 to the inner surface of the front angle of the roof 12, sealed engagement is established between the roof and the head curtain and water is prevented from entering into the dock shelter when a truck is positioned in contact with and engages the head curtain.

Each of the upper and lower panels 22a, 22b as well as the lower panel extension 22c of the left side section 22 is provided with a respective pair of front and aft angles. The front angles of each of the aforementioned side section panels are adapted to receive a lateral edge of a left side curtain 14. The left side curtain 14 is securely coupled to the front angle of the left side section 22 by means of the combination of one of the left side reinforcing bars 68 and a plurality of connecting pins 90 as shown in the sectional view of FIG. 5 for the embodiment of FIG. 3. By positioning the lateral edge of the left side curtain 14 within the front angle of the left side section 22 along the length thereof and maintaining it in position by means of the forward left side reinforcing bar, water is prevented from entering into the inner portion of the dock shelter 10. The left side curtain 14 is also provided with a plurality of spaced, elongated stays 14a disposed along the length of the side curtain, which stays are of similar construction to the stays 20c used in the head curtain 20 and also serve to yieldingly urge the curtain to remain in its normal, at-rest position, wherein the curtain extends across the face of the aperture in the wall, in substantially parallel relation thereto.

A right side curtain 16 is similarly adapted for secure positioning within the front angle of the right side section 24. The right side curtain 16 extends substantially the entire length of the right side section 24 and is coupled in a sealed manner by means of the combination of a plurality of connecting pins 26 and one of the right side reinforcing bars 72. The right side curtain 16 is also provided with a plurality of spaced, elongated stays 16a disposed along the length thereof to yieldingly urge the right side curtain to a position wherein the curtain extends across the front of the doorway 18.

Each of the left and right side curtains 14, 16 may also be provided with a respective rigidifying band 14b, 16b on the lower edge portion thereof. Each of the rigidifying bands 14b, 16b is comprised of a high strength, resilient material such as spring steel or an ultra high molecular weight polyethylene. The rigidifying bands 14b, 16b protect the respective lower end portions of the left and right side curtains 14, 16 from impact damage by a truck as it is moved into position in the loading dock shelter 10. These rigidifying bands also protect respective foam-filled bottom pads 62, positioned within the lower side portions of the dock shelter 10 from damage by a vehicle as it moved into position within the dock shelter or pulls away from the dock shelter. Only the left bottom pad 62 is shown in FIG. 2 for simplicity.

The loading dock shelter 10' illustrated in FIG. 3 also includes an outer frame comprised of a roof 12' and left and right side sections 22', 24', each of which is formed of a single, unitary structure preferably comprised of a high strength plastic. As in the case of the embodiment illustrated in FIG. 1, the roof 12' of the loading dock shelter 10' includes two pairs of spaced, elongated reinforcing ribs 32' and 34' on the upper surface thereof and adjacent to respective end portions of the roof as illustrated in the sectional view of FIG. 7. Similarly, each of the left and right side sections 22', 24' is provided with a respective plurality of spaced, elongated reinforcing ribs 36' and 38' extending substantially the length thereof. A head curtain 20 (shown in dotted line form) is coupled to and suspended from the inner surface of a front angle 12a' of the roof 12'. The head curtain 20 extends to and overlaps each of the left and right side sections 22' and 24' and is positioned forward of the respective front angles thereon. Left and right side curtains 14 and 16 are coupled to and supported by the front angled portions of the left and right side sections 22' and 24', respectively. Left and right protective bumpers 28 and 30, which are similar to those illustrated in the embodiment of FIG. 1, are positioned adjacent to respective lower portions of the left and right side curtains 14 and 16 and provide protection not only for the side curtains, but also for internal dock shelter structure described in detail below. Thus, the embodiment of the present invention illustrated in FIG. 1 differs from that illustrated in FIG. 3 primarily in its use of multi-member, telescoping roof and side sections.

Positioned in respective lower portions of the left and right side sections of both embodiments of a loading dock in accordance with the present invention are respective left and right bottom pads 62 and 64. The left bottom pad 62 is adapted to be engaged and supported by a facing pair of lower pad slide brackets 78 positioned on respective lower ends of each of the left side reinforcing bars 68. A similar arrangement for the right bottom pad 64 is provided in the form of lower pad slide brackets 80 connected to respective lower ends of the right side reinforcing bars 72. Each of the foam-filled left and right bottom pads 62, 64 fills the space defined by its immediately adjacent side section and side curtain of the dock shelter as well as the adjacent portion of the wall upon which the dock shelter is mounted and a lateral portion of a truck positioned within the dock shelter. The bottom pads 62 and 64 thus isolate internal portions of the dock shelter from the outer environment with a truck positioned within the dock shelter and prevent the movement of air between the inside and outside of the building through the aperture 18 in its wall. Mounted to the building wall immediately adjacent to respective lower portions of the left and right side curtains 14, 16 are left and right protective bumpers 28 and 30. Each of the protective bumpers 28, 30 is comprised of a high strength material such as steel and protects the lower structure of the dock shelter from impact damage by a truck using the dock shelter.

Referring to FIG. 6, there is shown the manner in which the dock shelter may be mounted to a building wall 54. The aft right side reinforcing bar 72 is positioned immediately adjacent to and within the aft angle 52 of the right side section 24. A plurality of threaded coupling pins 96 are inserted through aligned apertures in the aft angle 52 and the aft right side reinforcing bar 72 as well as through mounting apertures in the building wall 52. Using the aft angle of the roof section, which is not shown in FIG. 6, the upper roof portion of the dock shelter may be similarly securely mounted to the building wall around the aperture 18 therein. FIG. 6 also illustrates the manner in which the right side curtain 16 is securely mounted to the inner surface of the front angle 50 of the right side section 24 by means of the combination of the forward right side reinforcing bar 72' and a plurality of threaded coupling pins 94 inserted through respective aligned apertures therein. The right bottom pad 64 is shown disposed within the space defined by a portion of the wall 54, the right side section 24, the right side curtain 16, and where a truck would be positioned immediately adjacent to and substantially aligned with the aperture 18 in the wall 54 (although the truck is not shown in FIG. 6 for simplicity).

Referring to FIG. 8, there is shown the upper right corner of the molded modular dock shelter illustrated in FIG. 2. As shown in FIG. 8, the head curtain 20 is mounted to the front angle of the roof 12. The right side section 24, which includes a front angle 50, extends downward from a lateral edge of the roof 12. The right side curtain 16 extends inward from the right side section 24 and is attached to the front angle 50 of the side section in an overlapping manner. A plurality of spaced protective pleats 20b are also mounted to and extended downward from the front angle of the roof 12 and are positioned over an end of the head curtain 20. A fabric loop 33 is attached by conventional means such as riveting or sewing to the inner surface of the head curtain 20 adjacent to an end thereof. A windstrap 31 preferably comprised of a flexible, resilient material such as rubber is inserted through the fabric loop 33. Respective ends of the windstrap 31 are inserted through upper and lower mounting holes 35 within the front angle 50 of the right side section 24. Each of the ends of the windstrap 31 is retained in a respective mounting aperture 35 by conventional means such as a mounting ring attached to an end of the windstrap or by attaching the ends of the windstrap to a mounting bolt or screw attached to the side section by means of a metal eyelet.

There has thus been shown an improved molded, modular dock shelter comprised of a high strength, resilient and durable outer structure preferably comprised of a molded plastic and formed of a roof and left and right side sections. In one embodiment, the roof and side sections are of a multi-panel, telescoping construction to allow the dock shelter to be used with a wide range of doorway dimensions. The dock shelter further includes an inner metal support frame which not only increases the strength of the dock shelter, but also is used to securely attach respective curtains to each of the dock shelter sections as well as to securely mount the dock shelter to a wall so as to form a sealed structure. In addition, a plurality of dock shelters in accordance with the present invention may be securely coupled together such as by means of bolts in a side-by-side arrangement for use in an installation having a large number of adjacent loading docks. A plurality of dock shelters may also be coupled together to form a tunnel arrangement extending outward from a wall in which a door is located to the outer edge of a loading dock. In such an arrangement, only the outermost end section would typically be provided with side curtains. The molded modular dock shelter of the present invention is also adapted for use with various other types of loading dock sealing arrangements such as of the air inflatable type as disclosed in U.S. patent application Ser. No. 011,967, entitled "Air Perimeter Seal For Opening," filed Feb. 6, 1987, and assigned to the assignee of the present application.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. For use with a loading dock positioned adjacent to an aperture in a wall, a shelter positioned about said aperture and comprising:
   a roof section mounted to said wall above the aperture therein, said roof section including a plurality of roof panels coupled in a telescoping manner for varying the length thereof so as to accommodate a range of wall aperture widths;
   left and right lateral sections mounted to said wall adjacent to respective lateral portions of the aperture therein, each of said lateral sections including respective pluralities of side panels coupled in a telescoping manner for varying the length thereof so as to accommodate a range of wall aperture heights;
   a header curtain connected to and suspended from said roof section; and
   left and right curtains respectively connected to said left and right lateral sections and aligned in mutual facing relation adjacent to the aperture in said wall.

2. The loading dock shelter of claim 1 wherein said roof section includes first and second end panels and a center roof cap coupled therebetween in a sliding manner and each of said left and right lateral sections includes respective upper and lower side panels and a center panel coupled therebetween in a sliding manner.

3. The loading dock shelter of claim 2 further comprising a plurality of coupling pins for securely coupling said first and second roof end panels to said center roof cap and respective upper and lower side panels to a respective center panel.

4. The loading dock shelter of claim 1 in each of said roof and left and right lateral sections includes a respective front angle extending along the length thereof and wherein a respective curtain is attached to an inner surface of each of said front angles.

5. The loading dock shelter of claim 1 further comprising an internal support structure coupled to said roof and to said left and right lateral sections.

6. The loading dock shelter of claim 5 further comprising means for securely coupling said internal support structure to the wall.

7. The loading dock shelter of claim 5 wherein said internal support structure includes first, second and third pluralities of elongated bars respectively coupled to and positioned within said roof and said left and right lateral sections.

8. The loading dock shelter of claim 7 wherein each of said elongated bars is comprised of hollow metal tubing.

9. The loading dock shelter of claim 1 further comprising left and right bottom pads respectively positioned within lower portions of said left and right lateral sections, 10. The loading dock shelter of claim 1 wherein each of said roof and said left and right lateral sections is comprised of a molded plastic.

11. The loading dock shelter of claim 10 wherein each of said roof and left and right lateral sections includes a plurality of reinforcing ribs molded therein.

12. The loading dock shelter of claim 10 wherein said molded plastic is high strength polyethylene.

13. The loading dock shelter of claim 1 further comprising means for restricting upward movement of said header curtain.

14. The loading dock shelter of claim 13 wherein said means for restricting upward movement of said header curtain includes left and right windstraps each respectively coupled to said left and right side panels and to an adjacent end of said header curtain.

15. The loading dock shelter of claim 1 wherein each of said lateral sections includes upper and lower panels and an intermediate side panel connected therebetween.

16. The loading dock shelter of claim 15 wherein each of said upper and lower panels and an intermediate side panel are coupled together in a telescoping manner and said loading dock shelter further includes coupling means for securely coupling said upper and lower panels to said intermediate side panel along the respective lengths thereof whereby the length of each of said first and second side frames may be varied to accommodate a range of wall opening lengths.

* * * * *

UNITED STATES PATENT AND TRADEMARK OFFICE
CERTIFICATE OF CORRECTION

PATENT NO. : 4,825,607

DATED : May 2, 1989

INVENTOR(S) : John A. Frommelt and Robert J. Frommelt

It is certified that error appears in the above-identified patent and that said Letters Patent is hereby corrected as shown below:

Column 9, line 43 (claim 4), after "claim 1" delete "in"

and insert -- wherein --.

Signed and Sealed this

Nineteenth Day of December, 1989

*Attest:*

JEFFREY M. SAMUELS

*Attesting Officer*  *Acting Commissioner of Patents and Trademarks*